United States Patent
Dam-Hansen

(10) Patent No.: US 6,850,325 B2
(45) Date of Patent: Feb. 1, 2005

(54) TEMPERATURE COMPENSATED OPTICAL SYSTEM BASED ON A DIFFRACTIVE OPTICAL ELEMENT

(75) Inventor: Carsten Dam-Hansen, Taastrup (DK)

(73) Assignee: Kamstrup A/S, Skanderborg (DK)

( * ) Notice: Subject to any disclaimer, the term of this patent is extended or adjusted under 35 U.S.C. 154(b) by 0 days.

(21) Appl. No.: 10/611,988

(22) Filed: Jul. 3, 2003

(65) Prior Publication Data

US 2004/0070769 A1 Apr. 15, 2004

Related U.S. Application Data

(60) Provisional application No. 60/393,584, filed on Jul. 5, 2002.

(51) Int. Cl.$^7$ .............................................. G01N 21/00
(52) U.S. Cl. ...................... 356/338; 356/28.5; 356/521; 359/142; 250/201.6
(58) Field of Search .................. 356/28–28.5, 336–341, 356/488, 494, 521; 359/571, 558, 142; 250/201.6, 201.7

(56) References Cited

U.S. PATENT DOCUMENTS

| | | | |
|---|---|---|---|
| 5,138,495 A | * 8/1992 | Shiono et al. | ............... 359/742 |
| 5,155,553 A | * 10/1992 | Chen | ........................... 356/457 |
| 5,260,828 A | 11/1993 | Londono et al. | |
| 5,682,236 A | 10/1997 | Trolinger et al. | |
| 5,796,470 A | 8/1998 | Ueda et al. | |
| 5,808,799 A | 9/1998 | Klocek | |
| 5,905,571 A | * 5/1999 | Butler et al. | ................ 356/328 |
| 6,016,222 A | * 1/2000 | Setani et al. | ................ 359/571 |
| 6,134,039 A | 10/2000 | Rudeen | |
| 6,262,844 B1 | 7/2001 | Soskind | |
| 6,323,949 B1 | 11/2001 | Lading et al. | |
| 6,646,744 B2 | * 11/2003 | Pedersen et al. | ............ 356/445 |

OTHER PUBLICATIONS

PCT International Search Report for PCT/DK03/00453.

* cited by examiner

*Primary Examiner*—Gregory J. Toatley, Jr.
*Assistant Examiner*—Sang H. Nguyen
(74) *Attorney, Agent, or Firm*—Harness, Dickey & Pierce, PLC

(57) ABSTRACT

The present invention relates to an apparatus for the determination of a condition or state of an object based on quasi-elastic interaction between the object and light transmitted to the object, the apparatus comprising a diffractive optical element having a diffracting region comprising a first diffracting structure for diffraction and focussing of a first light beam to the object, and a second diffracting structure that is laterally displaced relative to the first diffracting structure for diffraction and focussing of a second light beam to the object. The first and second diffracting structures focus the first and second light beams in the same focussing plane, the focussing plane being substantially perpendicular to propagation directions of the first and second light beams. The diffracting region further comprises a receiving diffracting structure for diffraction of light from the light beams that has interacted with the object. The diffracted light is diffracted in a diffraction angle. The size of the diffraction angle is substantially equal to the angle of incidence of the incoming light beam.

21 Claims, 4 Drawing Sheets

TEMPERATURE COMPENSATED OPTICAL SYSTEM BASED ON A DIFFRACTIVE OPTICAL ELEMENT

This application claims the benefit of Provisional Application No. 60/393,584, filed Jul. 5, 2002.

FIELD OF INVENTION

The present invention relates to an optical system that compensates for the changes in the emitted wavelength of e.g. a laser diode. Such wavelength changes may be caused by temperature changes or modehops. The system according to the present invention is provided by making the diffraction angles of a transmitter and a receiver part identical.

BACKGROUND OF THE INVENTION

The idea of implementing all the optical functions of a laser time of flight velocimeter (LTV) in a single diffractive optical element (DOE) was proposed in EP 0 770 219. The system of EP 0 770 219 was used for velocity measurements on solid surfaces. A major advantage of the system is that the calibration of the system is inherent in the diffractive optical element and is to first approximation independent of the wavelength, and therefore makes it possible to use inexpensive and non-stabilised laser diodes.

The LTV system is schematically illustrated in FIG. 1. A collimated beam, originating from a laser diode with a collimation lens, is incident on the central part of the DOE. The DOE diffracts, splits and focuses the beam into two foci, that make up the measurement volume of the sensor. Particles, carried by the flow, that passes the foci will scatter light in all directions. Some light will be scattered in the backward direction and is collected by the receiver part of the DOE. This is a lens that diffracts and images the measurement volume onto the two detectors. Particles that passes the measurement volume will give rise to a signal peak in each detector, with a time delay. When this time delay and the distance between the foci is known then the particle velocity can be determined, and hence the flow velocity.

The diffraction angle of DOEs is highly dependent on the wavelength, and even for temperature stabilised laser diodes the emitted wavelength will be undefined within 1–3 longitudinal modes. This is due to modehops and hysteresis in the temperature dependence. For a laser at 785 nm this implies that the wavelength uncertainty is approx. ±0.3 nm. This is illustrated in FIG. 2, where the measured emitted peak wavelength is shown as a function of the temperature of the laser diode.

For a LTV flow sensor it is important to have a spatially well-confined measurement volume in which the focused laser beams are parallel to a certain degree of accuracy. This is partly achieved by applying narrow apertures in front of the detectors (confocal system). The receiver diffractive lens has to image the measurement volume in the flow onto the detector apertures. However, if the diffraction angle of the receiver part differs from the angle of incidence of the transmitter part, the image position in the detector plane will depend on the wavelength. When having large detectors this is not a problem, but when narrow apertures are inserted, in order to reduce cross-talk and limit the measurement volume, this is a severe problem.

It is an object of the present invention to provide a solution of the above-mentioned problem—i.e. to provide a sensor configuration wherein the image position in the detector plane is independent of wavelength.

SUMMARY OF THE INVENTION

In FIG. 3, the calculated change in image position is shown as a function of the diffraction angle of the receiver part when the angle of incidence of the transmitter part is 65 degrees. The prior art system shown in FIG. 1 corresponds to the calculation where the receiver diffraction angle is 30 degrees. It is clear that only for the exact same angles the change in position is zero. For a difference in angles of 10 degrees a shift in image position of approx. 5 µm for a wavelength shift of 0.5 nm is observed. This shift is critical because the size of the aperture would typically be of the same size.

The above-mentioned object is complied with by providing, in a first aspect, an apparatus for the determination of a condition or state of an object based on quasi-elastic interaction between the object and light transmitted to the object, comprising:

a diffractive optical element being adapted to be illuminated by an incoming light beam, the diffractive optical element comprising a diffracting region defining a diffraction plane, the incoming light beam forming an angle of incidence to a normal of the diffraction plane, the diffracting region comprising a first diffracting structure for diffraction and focussing of a first light beam to the object, and a second diffracting structure that is laterally displaced relative to the first diffracting structure for diffraction and focussing of a second light beam to the object, the first and the second light beam being diffracted at a first diffraction angle to a normal of the diffraction plane, the first and second diffracting structures focussing the first and second light beams in the same focussing plane, said focussing plane being substantially perpendicular to propagation directions of the first and second light beams, the diffracting region further comprising a receiving diffracting structure for diffraction of light from the light beams that has interacted with the object, the diffracted light being diffracted in a second diffraction angle to the normal of the diffraction plane, wherein the size of the angle of incidence of the incoming light beam and the second diffraction angle are substantially equal.

The apparatus may further comprise a receiver for collecting and detecting light diffracted from the receiving diffracting structure, and a processor operatively connected to the receiver for determining the condition or state of the object based on the detected light.

The diffracting region may comprise additional diffracting structures for diffracting additional light beams to the object, each of the additional light beams being diffracted at the first diffraction angle to a normal of the diffraction plane. Preferably, the additional light beams should be focused in the same focussing plane as the first and second light beams.

The apparatus may further comprise a light source for emission of the incoming light beam. In addition, the apparatus may comprise means for collimating the emitted light beam. Such collimating means may be a refractive member, such as a lens.

Preferably, the light source emits substantially monochromatic light between 400 and 10600 nm. Even more preferably, the light source is a laser, such as a laser diode.

Applicable wavelengths for usable laser diodes are e.g. 635, 660–680, 780, 800, 830 nm. The detector may comprise a first and a second light sensitive area. Even further, spatial filters may be positioned in front of the light sensitive areas of the detector.

Such spatial filters may simply be pinholes. Alternatively, the spatial filters positioned in front of the light sensitive areas may comprise optical fibers connected to the light sensitive areas of the detector. This could be two optical fibers.

The detector may comprise a single light sensitive area in front of which, a spatial filter is positioned.

In a second aspect, the present invention relates to a flow sensor for measuring flow velocity of a fluid (gas or liquid). Preferably, the flow sensor comprises an apparatus according to the first aspect of the present invention.

In a third aspect, the present invention relates to a velocity sensor for measuring a surface velocity of an object. Preferably, the velocity sensor comprises an apparatus according to the first aspect of the present invention.

In a fourth aspect, the present invention relates to a method for the determination of a condition or state of an object based on quasi-elastic interaction between the object and light transmitted to the object, the method comprising the step of:

providing a diffractive optical element and illuminating said diffractive optical element by a incoming light beam, the diffractive optical element comprising a diffracting region defining a diffraction plane, the incoming light beam forming an angle of incidence to a normal of the diffraction plane, the diffracting region comprising
a first diffracting structure for diffraction and focussing of a first light beam to the object, and
a second diffracting structure that is laterally displaced relative to the first diffracting structure for diffraction and focussing of a second light beam to the object, the first and the second light beam being diffracted at a first diffraction angle to a normal of the diffraction plane, the first and second diffracting structures focussing the first and second light beams in the same focussing plane, said focussing plane being substantially perpendicular to propagation directions of the first and second light beams, the diffracting region further comprising
a receiving diffracting structure for diffraction of light from the light beams that has interacted with the object, the diffracted light being diffracted in a second diffraction angle to the normal of the diffraction plane, wherein the size of the angle of incidence of the incoming light beam and the second diffraction angle are substantially equal.

BRIEF DESCRIPTION OF THE DRAWINGS

The present invention will now be described in further details with reference to the accompanying figures, where.

DETAILED DESCRIPTION OF THE INVENTION

As already stated, the present invention relates to an optical system that compensates for the changes in the emitted wavelength of a light source, such as a laser diode. Such wavelength fluctuations may be caused by temperature changes or modehops.

Figure 4:
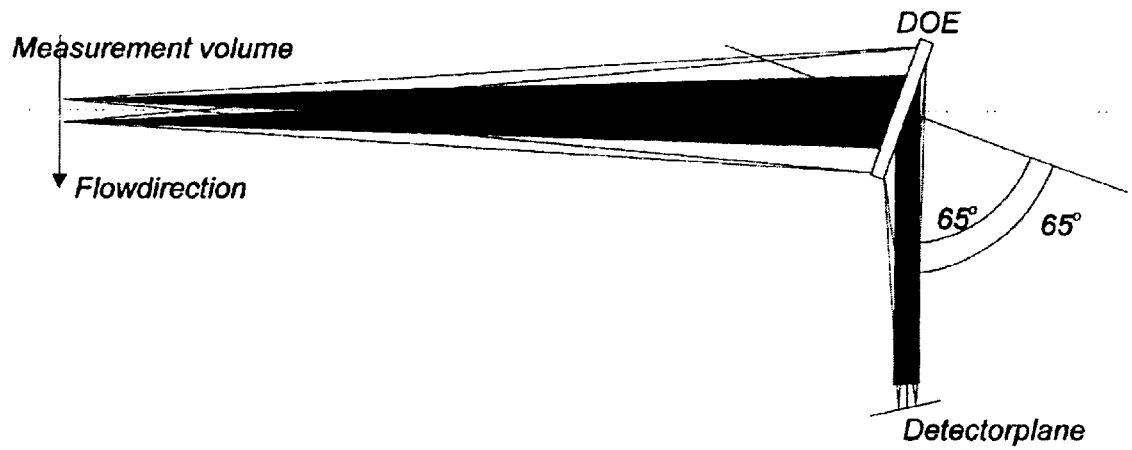
FIG. 4 shows a compensated LTV system with a diffraction angle of the receiver part being identical to the angle of incidence of the transmitter part.

According to the present invention, wavelength compensation is provided by making the diffraction angles of a transmitter and a receiver part identical. In this way, backscattered light from small particles passing a measurement volume will be collected by a receiver lens and diffracted in the opposite direction of the incoming collimated laser beam from the laser diode. This is illustrated in FIG. 4. The configuration shown in FIG. 4 introduces a minor problem, in that light collected and diffracted by the receiver part has to be spatially separated from the incoming collimated laser beam. This can be done in a number of different ways.

Figure 1:
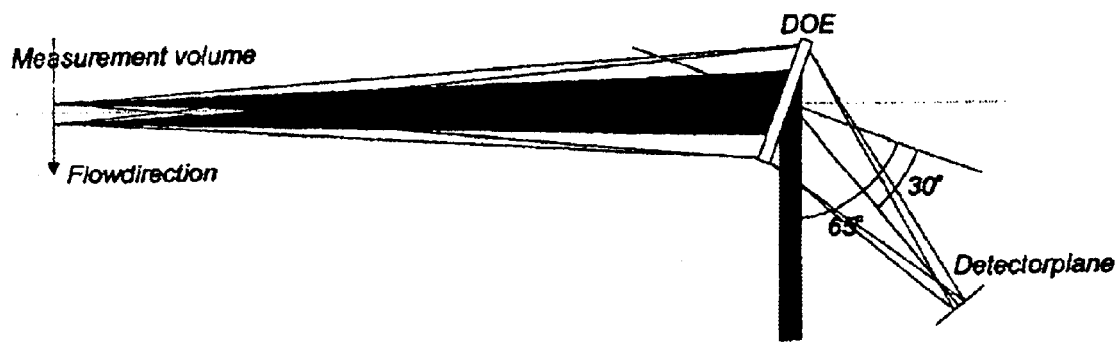
FIG. 1 shows a non-compensated LTV system.
Figure 2:
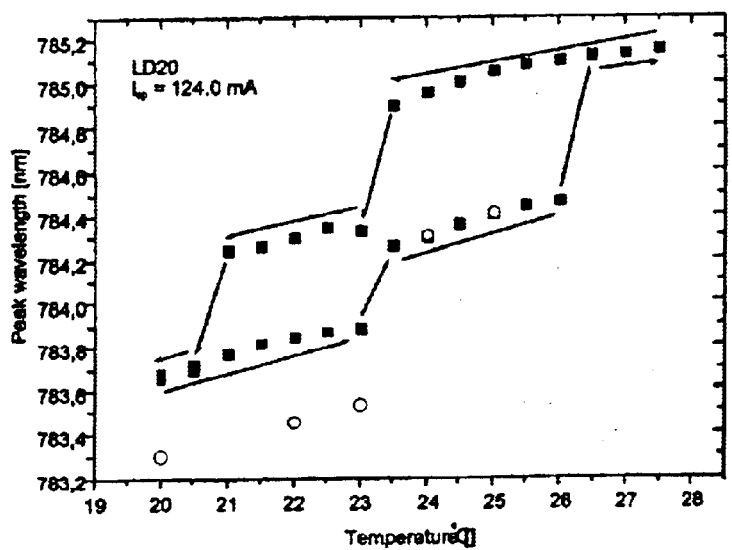
FIG. 2 shows the peak emission wavelength of laser diode as a function of the case temperature of the laser diode—the arrows indicates the measurement cyclus.
Figure 3:
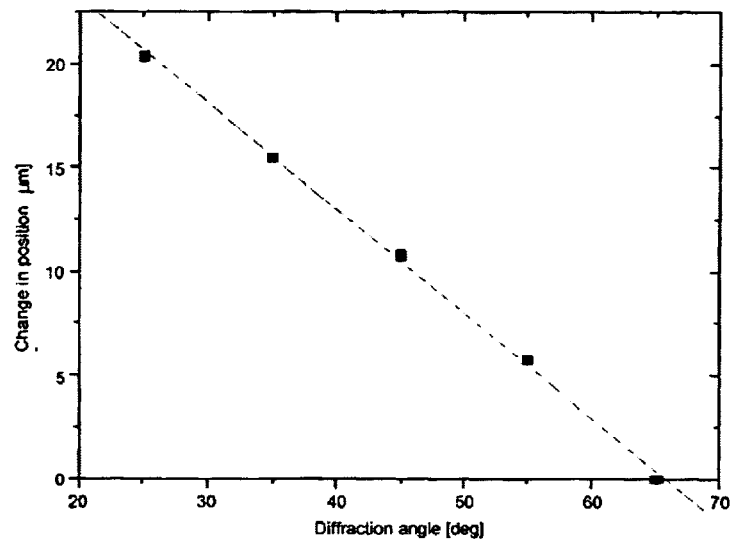
FIG. 3 illustrates changes in image position for different diffraction angles of the receiver part, the angle of incidence of the transmitter part is 65 degrees—the diffraction angle of the transmitter is 25 degrees and equal to the angle of incidence of the receiver part—change in wavelength is 0.5 nm.

The embodiment shown in FIG. 1 and FIG. 4 is based on using a transmission DOE. By applying a reflective coating to a surface relief DOE, the DOE can be used as a reflection DOE. The reflective coating could be a thin layer of Au, but other materials could also be used e.g. Al, or Ag. The DOE itself may be fabricated in photoresist.

Figure 5:
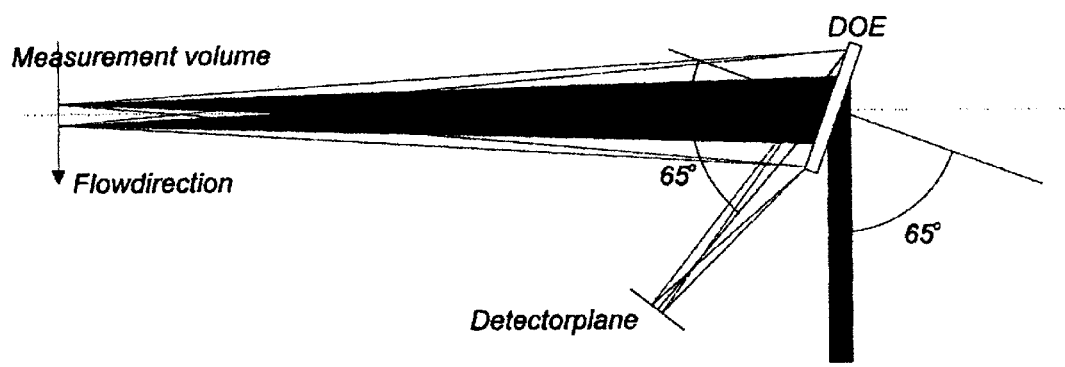
FIG. 5 shows a compensated LTV system using a transmission transmitter and a reflection receiver element.

In another embodiment, the DOE is divided into a reflection element and a transmission element. This is shown in FIG. 5, where the receiver DOE is implemented as a reflection element, while the transmitter element is a transmission DOE. The light diffracted by the receiver will obtain a direction which corresponds to a simple reflection/mirroring of the collimated beam in the plane of the DOE.

Figure 6:
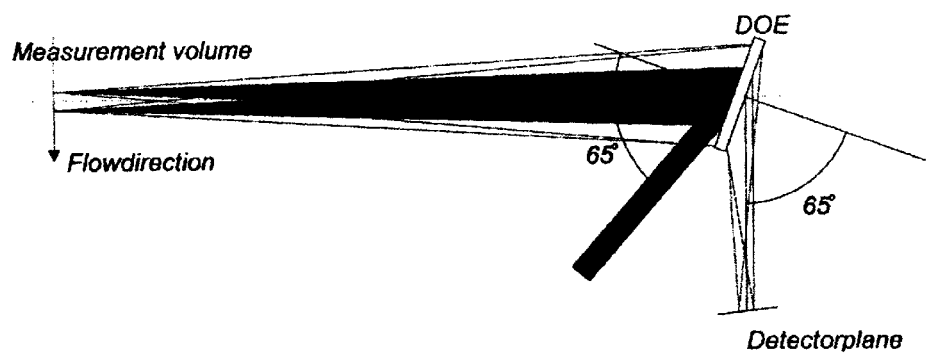
FIG. 6 shows a compensated LTV system using a reflection transmitter and a transmission receiver element.

The opposite solution is also possible. Here the transmitter DOE is implemented as a reflection DOE, and the receiver DOE is implemented as a transmission DOE. This is illustrated in FIG. 6.

Figure 7:
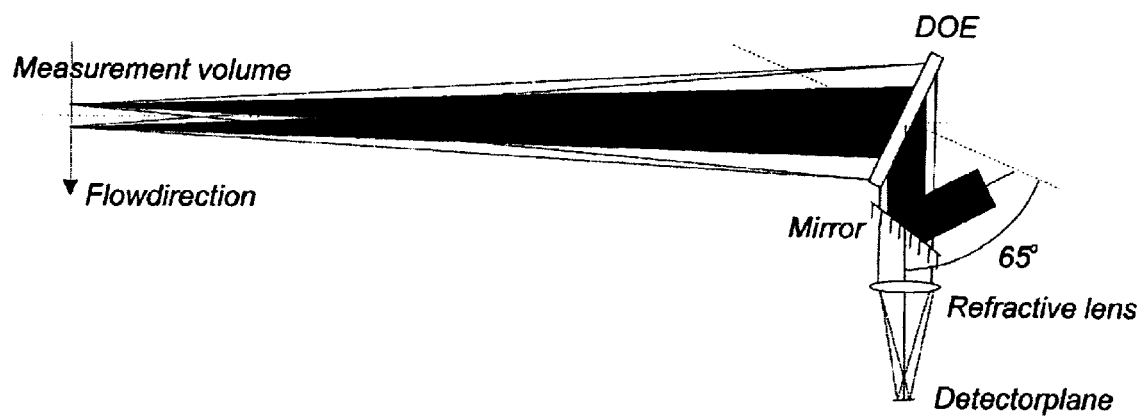
FIG. 7 shows a compensated LTV system using identical diffraction angles and identical focal lengths.

Preferably, the DOE is implemented as a transmission surface relief grating in photoresist. It is produced using an analog interferometric writing setup, employing a HeCd-laser at 441.6 nm, using sequential multiple exposures. The total diffraction angle (angle of incidence plus diffraction angle) of approximately 90 degree is used in order to maximise the diffraction efficiency of the gratings by suppressing higher diffraction orders. The use of a surface relief grating structure makes it possible to replicate the DOE in polymer materials using e.g. injection molding or embossing. In the embodiment in FIG. 7 the angle of incidence is 65 degrees and the diffraction angle is 25 degrees. The focal length of the transmitter and receiver element are identical and equal to 160 mm. The diffraction angle of the receiver element is identical to the angle of incidence of the transmitter element. The fact that transmitter and receiver diffractive elements are identical, with respect to grating constant and focal length, simplifies the analog recording process of the DOE considerably. In this system the received light after the DOE is collimated—similar to the incoming laser beam. Here it is possible to separate the received light from the incoming laser beam by using a narrow mirror that only reflects the collimated laser beam. The received light will be able to pass this mirror and is imaged onto the detector plane using a refractive lens. It is important to use a refractive lens here in order not to introduce a new wavelength dependence by using a diffractive element. In the system shown in FIG. 7, it is possible to keep all the optical elements on one side of the DOE and thereby increasing the effective working distance of the sensor unit.

In general it should be mentioned that the present invention may be applied in a variety of applications. Thus, variations and modifications of the disclosed embodiments may be implemented by a skilled person in the art without departing from the spirit and scope of the present invention.

What is claimed is:

1. An apparatus for the determination of a condition or state of an object based on quasi-elastic interaction between the object and light transmitted to the object, comprising:
    a diffractive optical element being adapted to be illuminated by a incoming light beam, the diffractive optical element comprising a diffracting region defining a diffraction plane, the incoming light beam forming an angle of incidence to a normal of the diffraction plane, the diffracting region comprising
        a first diffracting structure for diffraction and focussing of a first light beam to the object, and
        a second diffracting structure that is laterally displaced relative to the first diffracting structure for diffraction and focussing of a second light beam to the object, the first and the second light beam being diffracted at a first diffraction angle to a normal of the diffraction plane,
    the first and second diffracting structures focussing the first and second light beams in the same focussing plane, said focussing plane being substantially perpendicular to propagation directions of the first and second light beams,
    the diffracting region further comprising
        a receiving diffracting structure for diffraction of light from the light beams that has interacted with the object, the diffracted light being diffracted in a second diffraction angle to the normal of the diffraction plane,
    wherein the size of the angle of incidence of the incoming light beam and the second diffraction angle are substantially equal.

2. An apparatus according to claim 1, further comprising
    a receiver for collecting and detecting light diffracted from the receiving diffracting structure, and
    a processor operatively connected to the receiver for determining the condition or state of the object based on the detected light.

3. An apparatus according to claim 2, wherein the detector comprises a first and a second light sensitive area.

4. An apparatus according to claim 3, further comprising spatial filters positioned in front of the light sensitive areas of the detector.

5. An apparatus according to claim 4, wherein the spatial filters positioned in front of the light sensitive areas are pinholes.

6. An apparatus according to claim 4, wherein the spatial filters positioned in front of the light sensitive areas comprises two optical fibers connected to the light sensitive areas of the detector.

7. An apparatus according to claim 1, wherein the diffracting region comprises additional diffracting structures for diffracting additional light beams to the object, each of the additional light beams being diffracted at the first diffraction angle to a normal of the diffraction plane.

8. An apparatus according to claim 7, wherein the additional light beams are focused in the same focussing plane as the first and second light beams.

9. An apparatus according to claim 7, wherein the detector comprises a single light sensitive area.

10. An apparatus according to claim 9, further comprising a spatial filter positioned in front of the light sensitive area of the detector.

11. An apparatus according to claim 1, further comprising a light source for emission of the incoming light beam.

12. An apparatus according to claim 11, further comprising means for collimating the emitted light beam.

13. An apparatus according to claim 11, wherein the light source emits light between 400 and 10600 nm.

14. An apparatus according to claim 11, wherein the light source is a substantially monochromatic light source.

15. An apparatus according to claim 14, wherein the light source is a laser.

16. An apparatus according to claim 14, wherein the light source is a laser diode.

17. A flow sensor for measuring flow velocity of a fluid, the flow sensor comprising an apparatus according to claim 1.

18. A flow sensor according to claim 17, wherein the fluid is a gas.

19. A flow sensor according to claim 17, wherein the fluid is a liquid.

20. A velocity sensor for measuring a surface velocity of an object, the velocity sensor comprising an apparatus according to claim 1.

21. A method for the determination of a condition or state of an object based on quasi-elastic interaction between the object and light transmitted to the object, the method comprising the step of:

providing a diffractive optical element and illuminating said diffractive optical element by a incoming light beam, the diffractive optical element comprising a diffracting region defining a diffraction plane, the incoming light beam forming an angle of incidence to a normal of the diffraction plane, the diffracting region comprising
        a first diffracting structure for diffraction and focussing of a first light beam to the object, and
        a second diffracting structure that is laterally displaced relative to the first diffracting structure for diffraction and focussing of a second light beam to the object, the first and the second light beam being diffracted at a first diffraction angle to a normal of the diffraction plane,
    the first and second diffracting structures focussing the first and second light beams in the same focussing plane, said focussing plane being substantially perpendicular to propagation directions of the first and second light beams,
    the diffracting region further comprising
        a receiving diffracting structure for diffraction of light from the light beams that has interacted with the object, the diffracted light being diffracted in a second diffraction angle to the normal of the diffraction plane,
    wherein the size of the angle of incidence of the incoming light beam and the second diffraction angle are substantially equal.

* * * * *